(12) United States Patent
Bound

(10) Patent No.: US 8,179,784 B2
(45) Date of Patent: May 15, 2012

(54) METHOD AND APPARATUS FOR RECOVERING A COMMUNICATIONS CONNECTION

(75) Inventor: Jim Bound, Hollis, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2143 days.

(21) Appl. No.: 10/893,612

(22) Filed: Jul. 16, 2004

(65) Prior Publication Data

US 2006/0013122 A1    Jan. 19, 2006

(51) Int. Cl.
*G01R 31/08* (2006.01)
*H04J 3/16* (2006.01)

(52) U.S. Cl. .................... 370/216; 370/242; 370/469

(58) Field of Classification Search .................. None
See application file for complete search history.

(56) References Cited

U.S. PATENT DOCUMENTS

| | | | |
|---|---|---|---|
| 6,282,209 B1* | 8/2001 | Kataoka et al. | 370/498 |
| 6,795,917 B1* | 9/2004 | Ylonen | 713/160 |
| 7,693,093 B2* | 4/2010 | Riedel et al. | 370/260 |
| 2003/0112826 A1* | 6/2003 | Ashwood Smith et al. | 370/503 |
| 2004/0004955 A1* | 1/2004 | Lewis | 370/351 |
| 2004/0214568 A1* | 10/2004 | Anderson | 455/426.1 |
| 2004/0247285 A1* | 12/2004 | Bonfiglio et al. | 386/65 |
| 2005/0010668 A1* | 1/2005 | Chen | 709/227 |
| 2005/0108576 A1* | 5/2005 | Munshi | 713/201 |
| 2006/0129792 A1* | 6/2006 | Bots et al. | 713/1 |
| 2006/0209760 A1* | 9/2006 | Saito et al. | 370/331 |
| 2007/0019547 A1* | 1/2007 | Ho et al. | 370/230 |
| 2007/0129015 A1* | 6/2007 | Iwamoto et al. | 455/41.2 |
| 2008/0098126 A1* | 4/2008 | Godwin et al. | 709/232 |
| 2008/0310299 A1* | 12/2008 | Saleh et al. | 370/221 |

* cited by examiner

*Primary Examiner* — Kwang B Yao
*Assistant Examiner* — Jutai Kao

(57) ABSTRACT

A method and apparatus for recovering a communications connection by storing a state variable that pertains to the status of a connection. When there is a need to restore the connection, the state variable is retrieved and used to restore the state of a protocol stack.

28 Claims, 11 Drawing Sheets

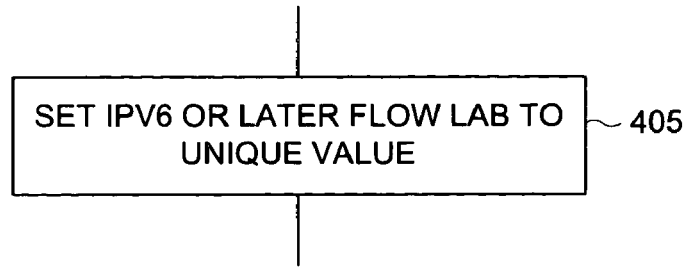
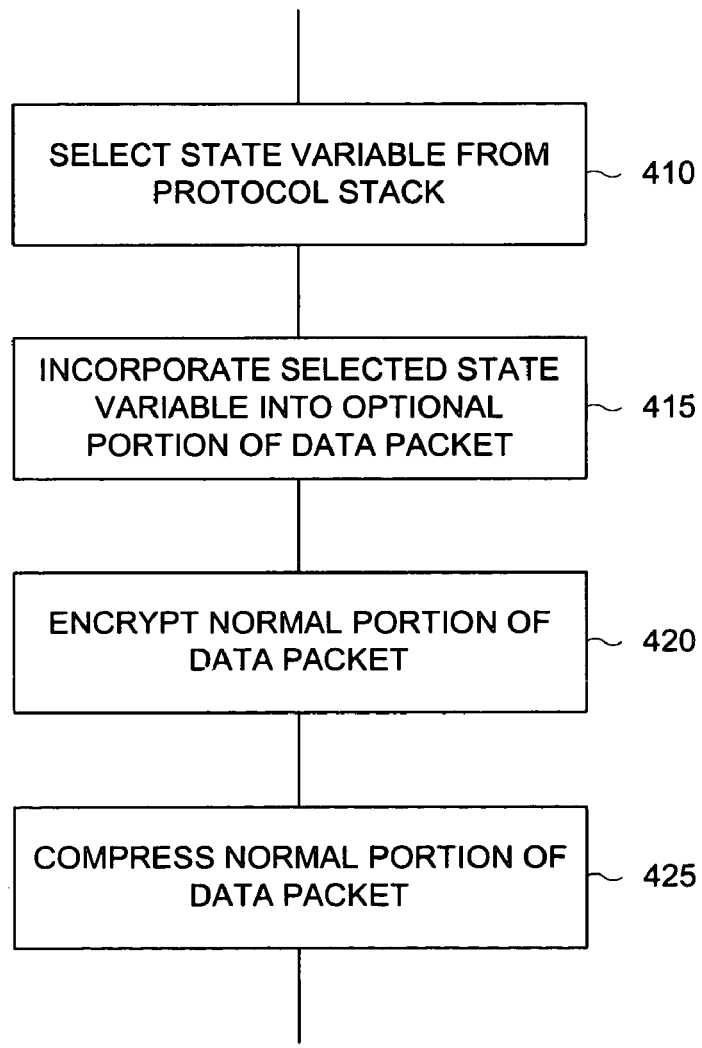

METHOD AND APPARATUS FOR RECOVERING A COMMUNICATIONS CONNECTION

BACKGROUND

There are many instances where a communications connection can be severed during normal computer operations. A communications connection can be lost when either a client computer or a server computer malfunctions. A communications connection can also be lost when the medium used to convey information between two systems is compromised. In this case, communications protocols governing the communications channel may dictate that a communications channel is to be abandoned (i.e. timed out) by one or both of the computer systems engaged in a communications session. Typically, when a communications connection is severed, or otherwise lost, the normal recovery mechanism used, up until now, was to reset the connection. By resetting the connections, a prior connection was simply discarded and there was no attempt to recover a connection mid-stream. Any data flowing through the connection was deemed incomplete and was resent using a new connection. In a practical sense, a connection may be used to transfer a large block of data. At any point during the communication, the communications channel could be lost. In this case, even if, for example, 99.9999% or more of the large data block was already sent, transmission of the entire data block would need to be repeated.

Although prior methods for reestablishing a connection are acceptable in a wide variety of applications, there are applications where the latency associated with abandonment of a current data transfer is not acceptable. For example, in a high-availability system, the need to communicate information as rapidly as possible is of paramount concern. Any latency suffered in such a high-availability system can result in a reduction is overall system availability. A loss in system availability may have catastrophic results.

Consider a high-availability air traffic control system. A system used for air traffic control may need to communicate information pertaining to a collision avoidance situation. If the information pertaining to the collision avoidance situation is not communicated to an aircraft in a timely manner, a mid-air collision may result. Another example of a high-availability system includes a real-time medical instrumentation system. Where patient data needs to be communicated as quickly as possible, the system may not be able to tolerate any latency associated with reestablishing a connection and re-conveyance of data to a host system. There are many other applications that simply can not tolerate the latency associated with prior methods of communication channel recovery. Some other applications include, but are not limited to Home Land Security and military command, control and intelligence gathering systems.

Wireless systems, or other systems where the aggregate data-carrying bandwidth is low, also can not tolerate complete abandonment of a communications channel. Consider a situation where a low-data-rate communications medium is the only medium available between two computer systems. In this situation, the loss of a communications channel could result in user frustration as a data block that was almost entirely transmitted needs to be retransmitted using a reestablished, low-data-rate communications channel. It should also be appreciated that the notion of a low-data-rate communications medium is a relative concept. For example, a 56 kilobit-per-second modem channel could be considered a low-data-rate medium today when surfing the Internet, whereas a digital subscriber line (DSL) connection may be considered too slow when transmitting large blocks of data.

SUMMARY

A method and apparatus for recovering a communications connection by storing a state variable that pertains to the status of a connection. When there is a need to restore the connection, the state variable is retrieved and used to restore the state of a protocol stack.

BRIEF DESCRIPTION OF THE DRAWINGS

Several alternative embodiments will hereinafter be described in conjunction with the appended drawings and figures, wherein like numerals denote like elements, and in which:

FIG. 6A is a flow diagram that depicts one alternative example method for making unique an IPv6 (or later IP version) compliant header;

FIG. 6B is a flow diagram that depicts one illustrative alternative method for storing a state variable;

DETAILED DESCRIPTION

Figure 1:
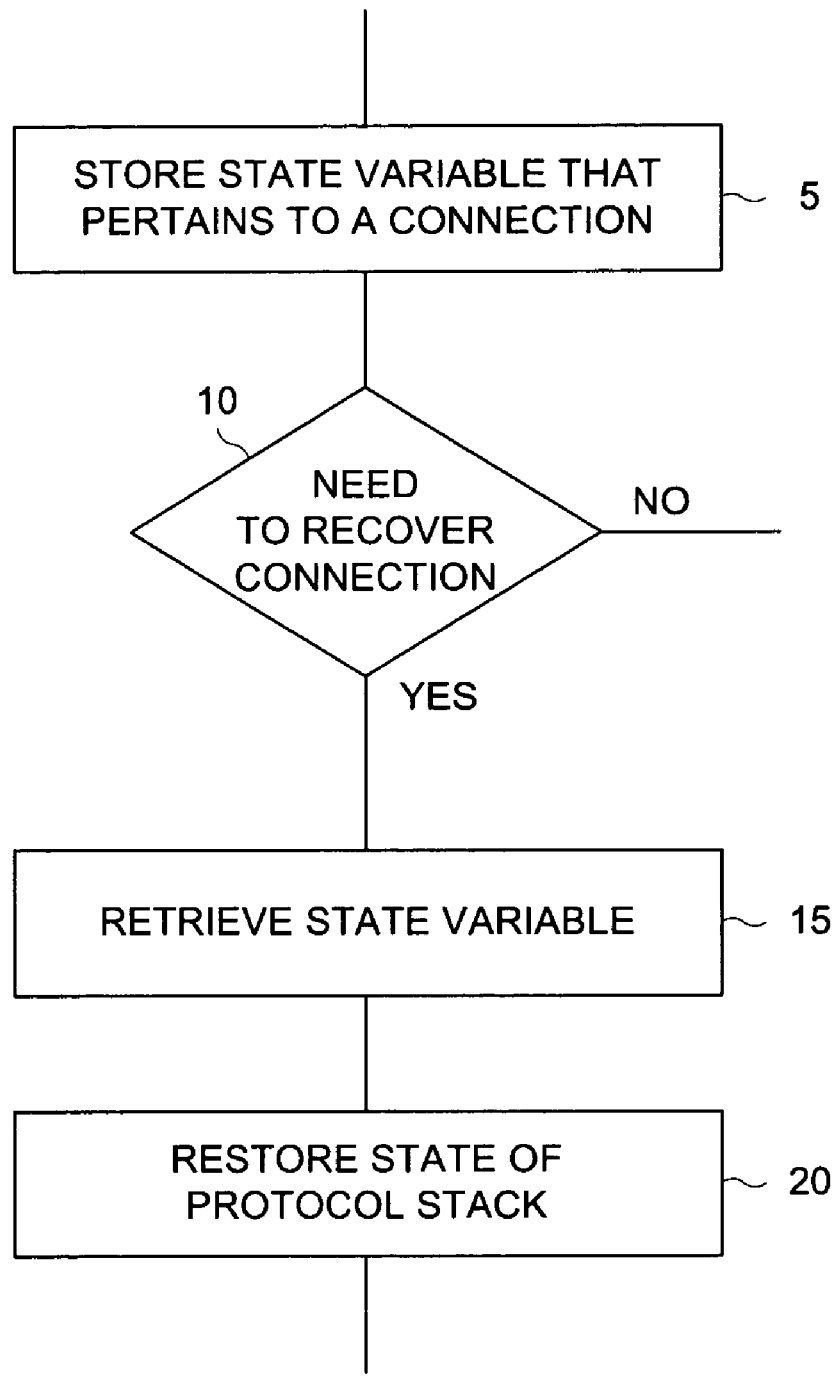
FIG. 1 is a flow diagram that depicts one example method for recovering a communications connection.

FIG. 1 is a flow diagram that depicts one example method for recovering a communications connection. According to this example method, a communications connection is recovered by storing a state variable that pertains to a connection (step 5). When there is a need to recover the connection (step 10), the state variable is retrieved (step 15) and is then used to restore the state of a protocol stack (step 20).

Typically, a connection between a first process and a second process is maintained in accordance with a communications protocol. For example, the transmission control protocol/Internet protocol (TCP/IP) is one example of a communications protocol that can be used to support the communications connection between two processes. In a typical implementation, the communications protocol is implemented in a suite of software modules collectively known as a "protocol stack". A protocol stack typically includes various instruction sequences that can be executed by a processor in a first computer. When a processor executes the protocol stack, it engages in a communications session with a second computer. Typically, a processor in the second computer also executes a protocol stack enabling the processor in the second computer to engage in a communications session with the first computer. It can be appreciated that the protocol stacks in each computer must be fashioned in accordance with a common protocol definition. The protocol stack in the second computer is commonly referred to as a corresponding protocol stack.

Many different protocol definitions currently exist and for each of these protocol definitions there are typically one or more implementations of a "protocol stack". The term protocol stack is derived from the layered structure a typical protocol definition describes. For example, most protocol definitions define communication services at varying levels of sophistication. At the most primitive layer, a protocol definition typically defines a physical medium that actually carries the data. The more primitive communication services included in a protocol definition are usually used to support higher level services, such as connection layer services. Even higher levels of service, e.g. guaranteed delivery of data, are often described in a protocol definition. Each of these layers of service typically corresponds to a layer in the "stack" of instruction sequence modules that are included in a protocol stack.

As a protocol stack operates, it maintains information about its internal state and further maintains information pertaining to one or more communications connections it is supporting. This type of information is typically included in a protocol stack state variable table. The protocol stack state variable table is typically stored in a computer readable medium accessible by a processor that is executing the protocol stack. When a communications connection is established, the protocol stack, when executed by a processor, will cause the processor to track the state of a connection using several sets of state variables, wherein each set of state variables corresponds to a particular layer in the protocol stack.

The communications connection itself is used to carry a flow of data between processes executing in a computer system. The data flowing between processes is generally organized into packets. As a packet moves through the various functional levels of a protocol stack, it acquires certain attributes, which are generally associated with the packet by a particular level of communications service provided by the protocol stack.

According to one variation of the present method, storing the state variable that pertains to the status of the connection comprises the storage of one or more of the state variables maintained by the protocol stack at a particular level of communications service provided by the stack. According to yet another variation in the present method, the data packet itself is also stored. According to yet another variation of the present method, the one or more state variables are stored collectively with the data packet. By storing the state information of the protocol stack collectively with the data packet itself, it becomes possible to re-create the state of the protocol stack and this enables continued processing of the data packet without the need to reset the connection between the two processes engaged in communications.

Figure 2:
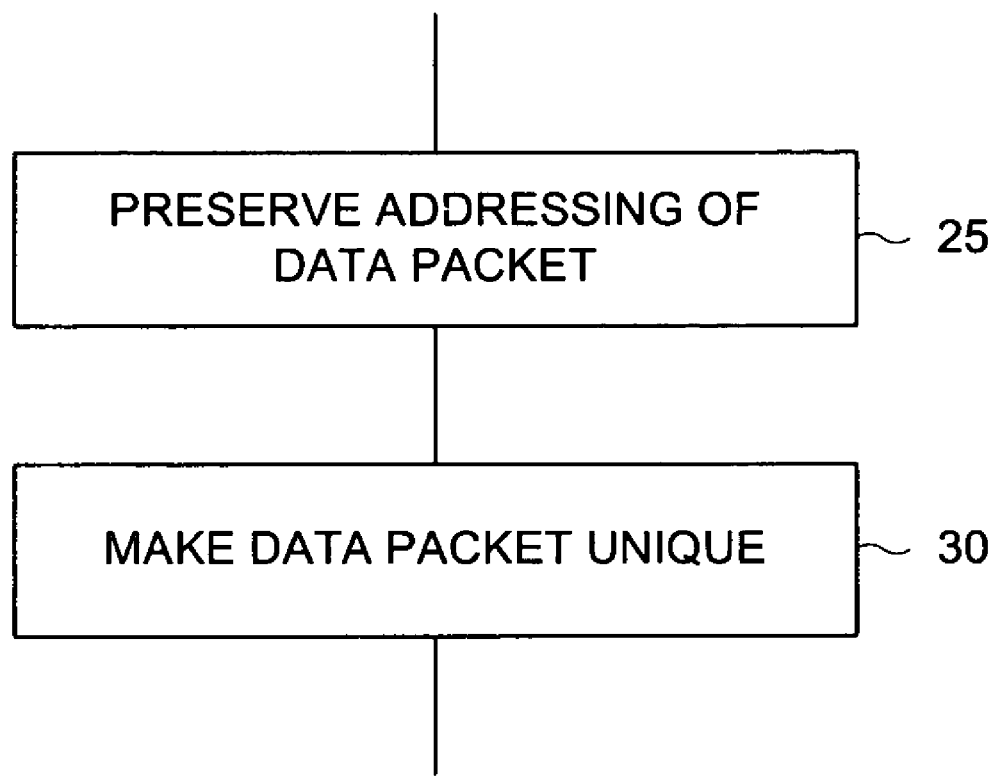
FIG. 2 is a flow diagram that depicts one alternative illustrative method for storing a state variable.

FIG. 2 is a flow diagram that depicts one alternative illustrative method for storing a state variable. According to this alternative illustrative method, a state variable is stored by preserving the addressing (step 25) of the data packet and making the data packet unique (step 30). One feature of the present method is that of restoring a communications connection in a manner that is essentially "mid-stream" capable. In order to be able to recover a communications connection in this matter, any addressing associated with the data packet must be preserved because the data packet must still be associated with a particular connection once the connection is re-established. In order to do this, many communication protocols, including the TCP/IP protocol, associate a data packet with a particular connection using addressing included in the data packet. Also, in order to restore a communications connection, each data packet must be made unique at a top-level header level so that ambiguities in restoration of the communications connection can be avoided. The term "top-level header", as used in this description, is meant to refer to a header used by the most upper-level communications service provided by an implementation of a communications protocol, i.e. a protocol stack.

Figure 3:
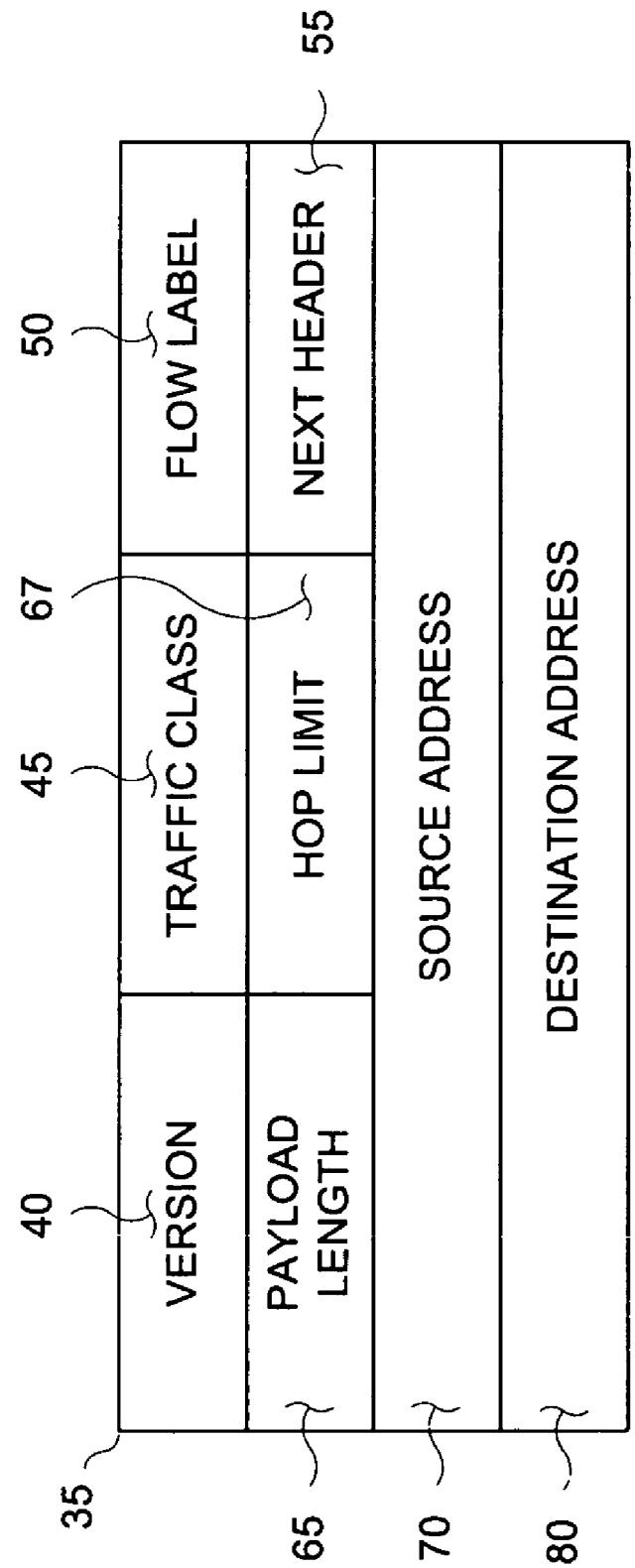
FIG. 3 is a pictorial diagram that illustrates one example embodiment of a data packet header that is compliant with Version 6 (and subsequent versions) of the Internet protocol.

FIG. 3 is a pictorial diagram that illustrates one example embodiment of a data packet header that is compliant with Version 6 (and subsequent versions) of the Internet protocol. Version 6 of the Internet protocol (IP) introduces the concept of various header types. For example, a typical Version 6 (and subsequent version) compliant, hereinafter IPv6, header 35 for a data packet includes a next header field 55. The next header field 55 is used by the protocol to define the type of header that an implementation of the protocol stack can expect subsequent to the receipt of the current data packet and its associated header. An IPv6 compliant header also includes a version identifier 40. The version identifier 40 is used to identify the version of the Internet protocol with which a particular header complies. Also included in an IPv6 compliant header is a traffic class indicator 45. The class indicator 45 is used to specify the type of data carried by the data packet. For example, the class indicator 45 can be used to identify a data packet that is carrying voice over IP data. The class indicator 45 can also be used to identify a data packet that is carrying video data. These examples of data types are presented herein for illustrative purposes only and are not intended to limit the scope of the claims appended hereto. An IPv6 compliant header 35 also includes a flow label 50 which is used to facilitate forwarding and routing of a set of data packets. For the sake of completeness of description, the figure also illustrates that an IPv6 compliant header 35 includes a payload length indicator 65 and a hop limit indicator 67, the use of both of these indicators is clearly understood by those skilled in the art.

Is also important to note that an IP V-6 compliant header includes a source address indicator 70, and a destination address indicator 80. In accordance with the Internet protocol, these indicators are used collectively to identify a communications connection between a first process and a second process.

Figure 4:
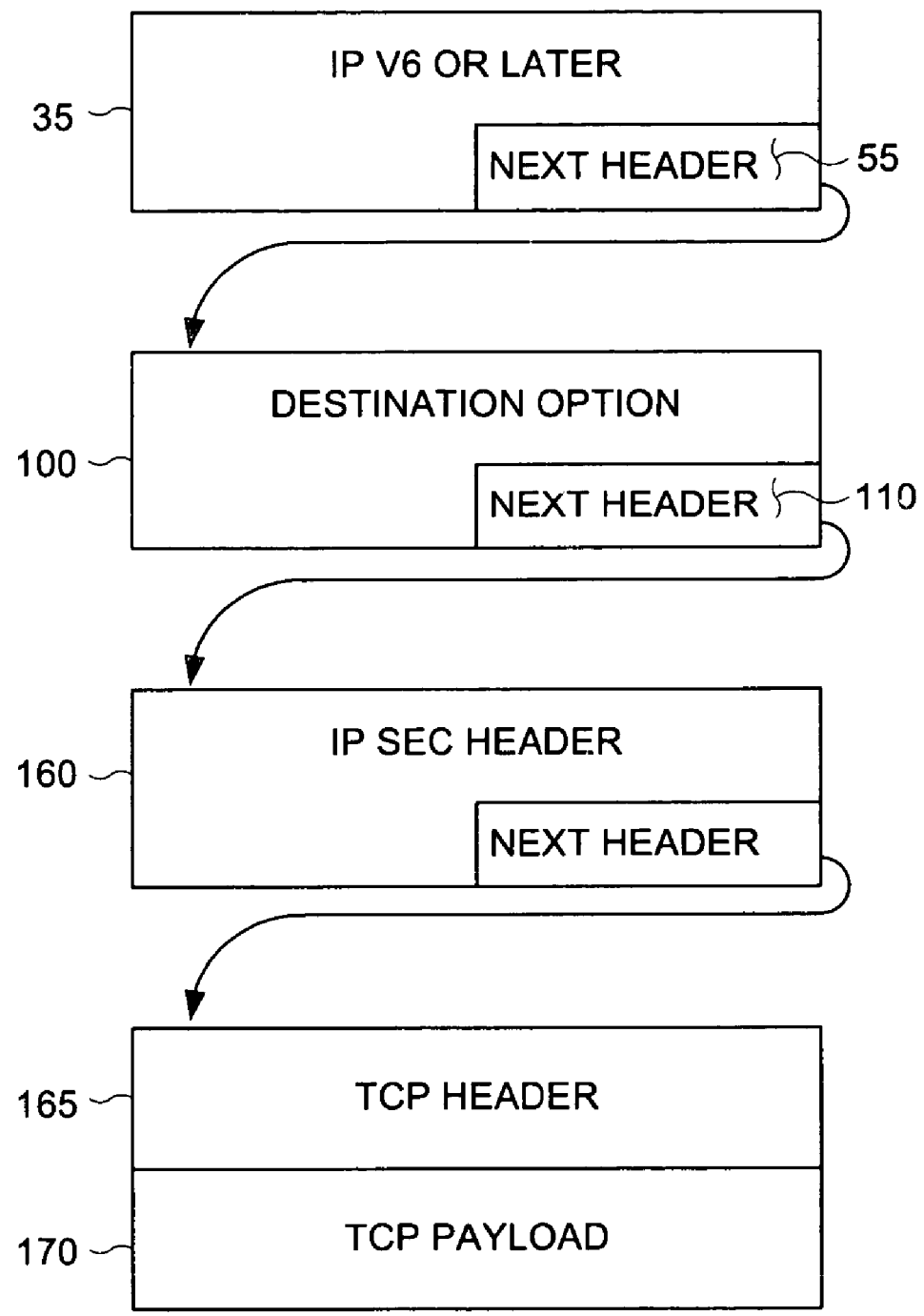
FIG. 4 is a pictorial diagram that illustrates one example method for chaining data packet headers.

FIG. 4 is a pictorial diagram that illustrates one example method for chaining data packet headers. As briefly introduced supra, IPv6 compliant headers can be chained together according to specific operational and communications requirements. For example, an IP Version 6 (or later version) compliant header 35 includes a next header indicator 55. The next header indicator 55 is used to indicate that a destination option header 100 is affiliated with a data packet. When a data packet needs to be secured, for example through the use of encryption, a security header is affiliated with a data packet. In this case, the next header indicator 55 is used to indicate that the next header in a chain of headers is a security header. A security header can include an Internet protocol security header commonly referred to as an "IPsec" header 160. It should be noted that both a destination option header 100 and an IP security header 160 can both be associated with a data packet. According to this figure, the data packet is referred to as a TCP payload 170.

When both a destination option header 100 and an IP security header 160 are associated with the data packet 170, the next header indicator 55 included in an IPv6 (or later version) compliant header 35 will indicate that the next header in a chain of headers is a destination option header 100. Included in the destination option header 100 is a next header indicator 110. The next header indicator 110 in the destination option header 100 will be used to indicate that the next header in a chain of headers is an IP security header 160. According to this example illustrative use case, a next header indicator included in the IP security header 160 will indicate that the next header in a chain of headers is a TCP header 165 associated with a TCP payload 170 (i.e. the data packet itself). The chaining of headers presented in FIG. 4 is provided herein for illustrative purposes only and is not intended to limit the scope of the claims appended hereto. For example, a destination option header 100 can be included in a chain of headers irrespective of whether or not an IP security header 160 is included. One advantageous feature of the present method is the use of the destination option header 100 for the storage of a state variable as will be herein further described.

Figure 5:
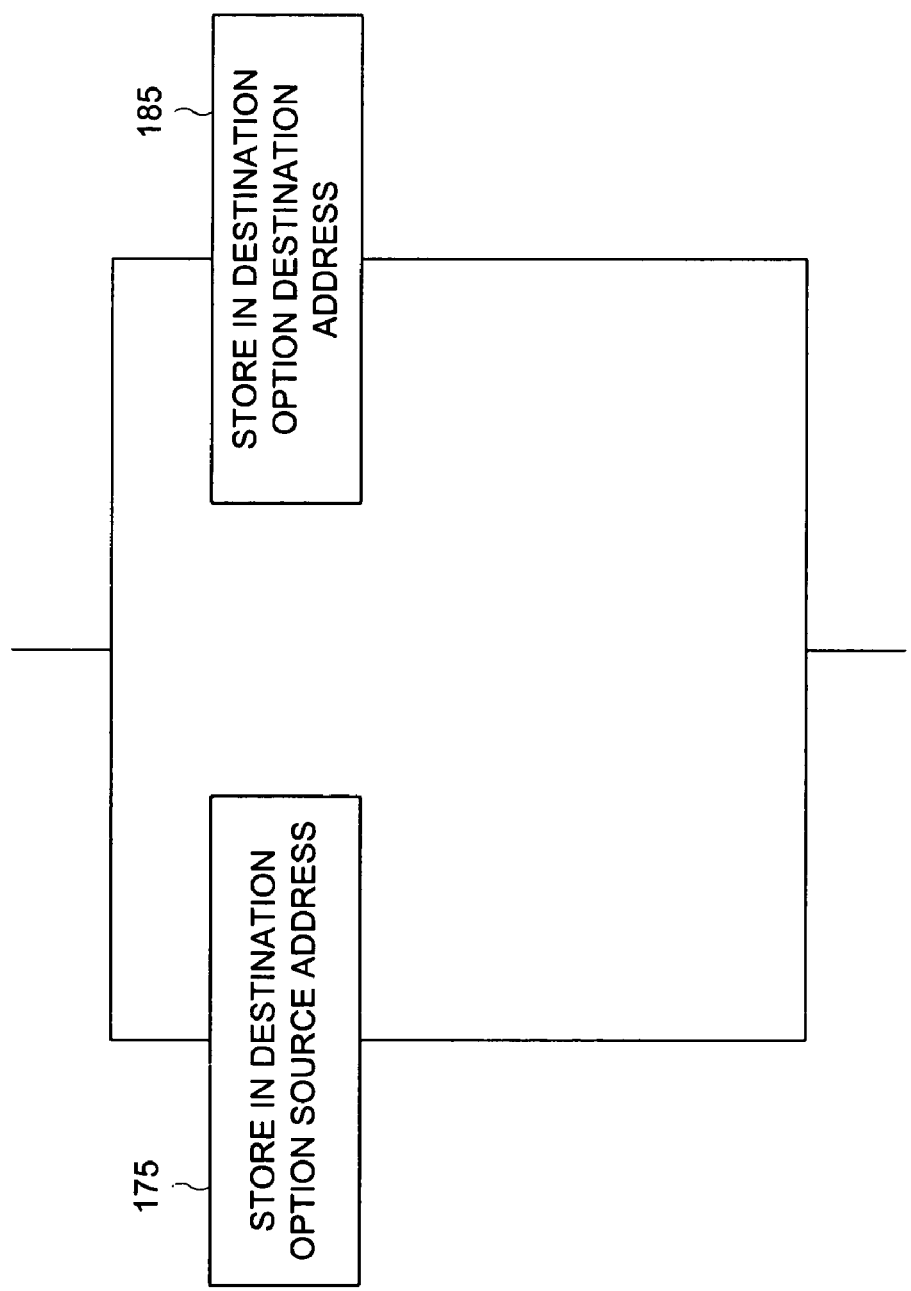
FIGS. 5 and 6 collectively form a flow diagram that depicts various alternative example methods for preserving the addressing of a data packet.
Figure 6:
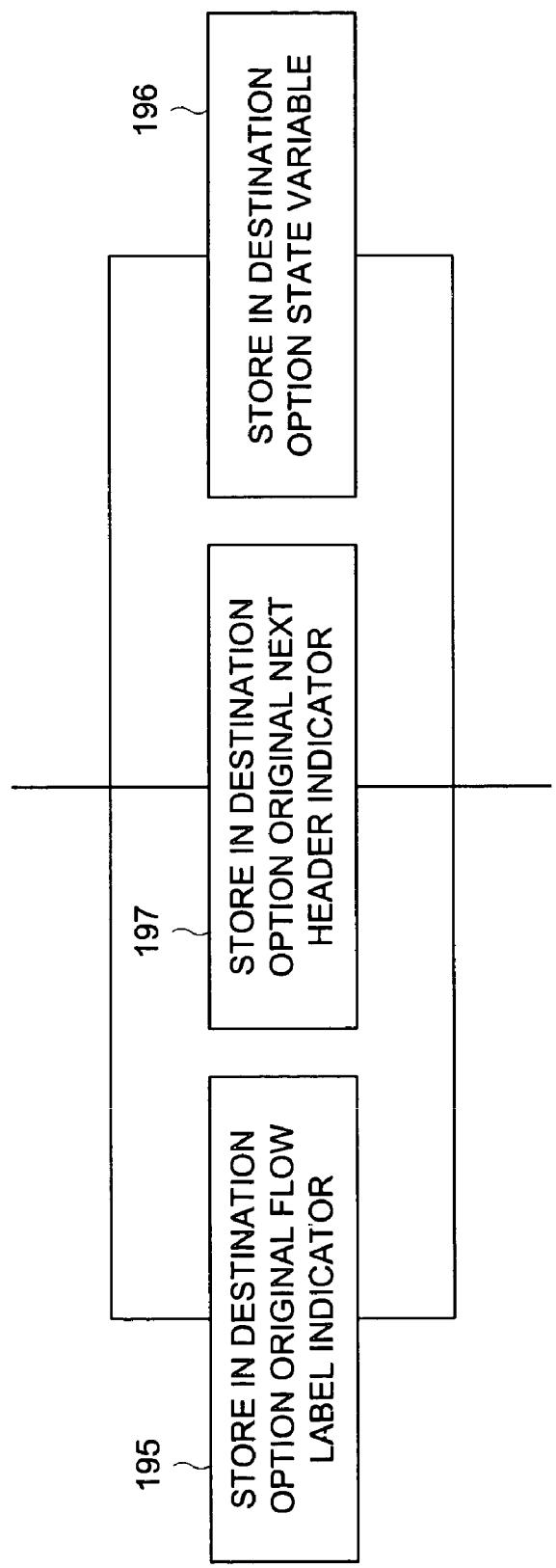

FIGS. 5 and 6 collectively form a flow diagram that depicts various alternative example methods for preserving the addressing of a data packet. According to this alternative method, the addressing of the data packet is preserved by storing addressing information in a destination option header, such as that depicted in FIG. 4. Accordingly, one alternative method for preserving the addressing of a data packet comprises the storage in a destination option header of a source address indicator (step 175). In yet another variation of the present method, addressing of a data packet is preserved by storing in a destination option header a destination address (step 185).

FIG. 6A is a flow diagram that depicts one alternative example method for making unique an IPv6 (or later IP version) compliant header. In order to make an IPv6 header unique, some portion of the header must be modified to provide a unique value. According to one variation of present method, this is accomplished by using the flow label indicator 50 in conjunction with at least one of a source address indicator 70 and a destination address indicator 80, both of which are included in an IPv6 header 35. The source address indicator 70 and the destination address indicator 80 are generally used to identify a particular connection (i.e. these collectively serve as a connection identifier). As such, the flow label indicator 50 is a better candidate for modification, thus rendering a data packet unique. Because the flow label indicator 50 is used for forwarding and routing purposes, it must also be preserved for subsequent recovery of a communications connection. According to one variation of the present method, the original flow label indicator is stored (step 195 in FIG. 6) in the destination option header 100 from whence it may be retrieved to support of communications connection recovery. The flow label indicator is then altered to reflect a unique value (step 405).

It should also be appreciated that, according to yet another variation of the present method, inclusion of the destination option header 100 in a chain of headers will require modification of the next header indicator 55 included in an IPv6 compliant header 35. Upon recovery of a communications connection, a destination option header 100 needs to be removed from the chain of headers. To support reestablishment of a communications connection, the next header indicator 55 in the IPv6 compliant header 35 needs to be restored to its original value. Accordingly, one example of variation of the present method provides for storing (step 197 in FIG. 6) the original next header indicator from the IPv6 compliant header 35 in the destination option header 100.

FIG. 6B is a flow diagram that depicts one illustrative alternative method for storing a state variable. Associated with every data packet are one or more state variables pertaining to the state of a protocol stack engaged in supporting a communications connection. As such, yet another illustrative variation of the present method provides for storing the one or more state variables (step 196 in FIG. 6) in the destination option header. In order to restore a communications connection, the one or more state variables associated with the data packet are used to restore the internal state of the protocol stack such that continued propagation of the data packet can continue to the various levels of communications services provided by the protocol stack.

It should be appreciated that, according to yet another variation of the present method, the state variable is selected from a particular implementation of a protocol stack (step 410). In a general sense, a particular implementation of a protocol stack need not necessarily be an implementation of the TCP/IP protocol. Accordingly, the scope of the claims appended hereto is not intended to be limited to any particular protocol and the present method can be applied to irrespective of the type of protocol used to support a communications connection. As such, the selected state variable is incorporated into an optional portion of a data packet. In the illustrative use cases presented herein, the optional portion of a data packet is embodied as a destination option header. It should be appreciated that the optional portion of a data packet can be embodied in a wide variety of formats and the scope of the claims appended hereto is not intended to be limited to any particular illustrative use cases presented herein. Accordingly, the claims are to be read in light of any implementation wherein the selected state variable is incorporated into an optional portion of the data packet (step 415).

FIG. 6B further illustrates that partitioning of connection recovery information into an optional portion of a data packet provides added benefit. For example, because the connection recovery information is stored in an optional portion of a data packet, a normally included portion of the data packet can be further processed according to additional operational requirements. According to one illustrative variation of the present method, the normal portion of the data packet is encrypted for security purposes (step 420). According to yet another alternative variation of the present method, the normal portion of the data packet is compressed (step 425). Such compression can be used to improve the efficacy of a communications connection by enabling the transmission of greater amounts of data within a particular data packet. It can be appreciated that, because the connection recovery information is not compressed or encrypted, the connection can be recovered without the need to first decrypt or decompress any payload data carried by a data packet.

Figure 7:
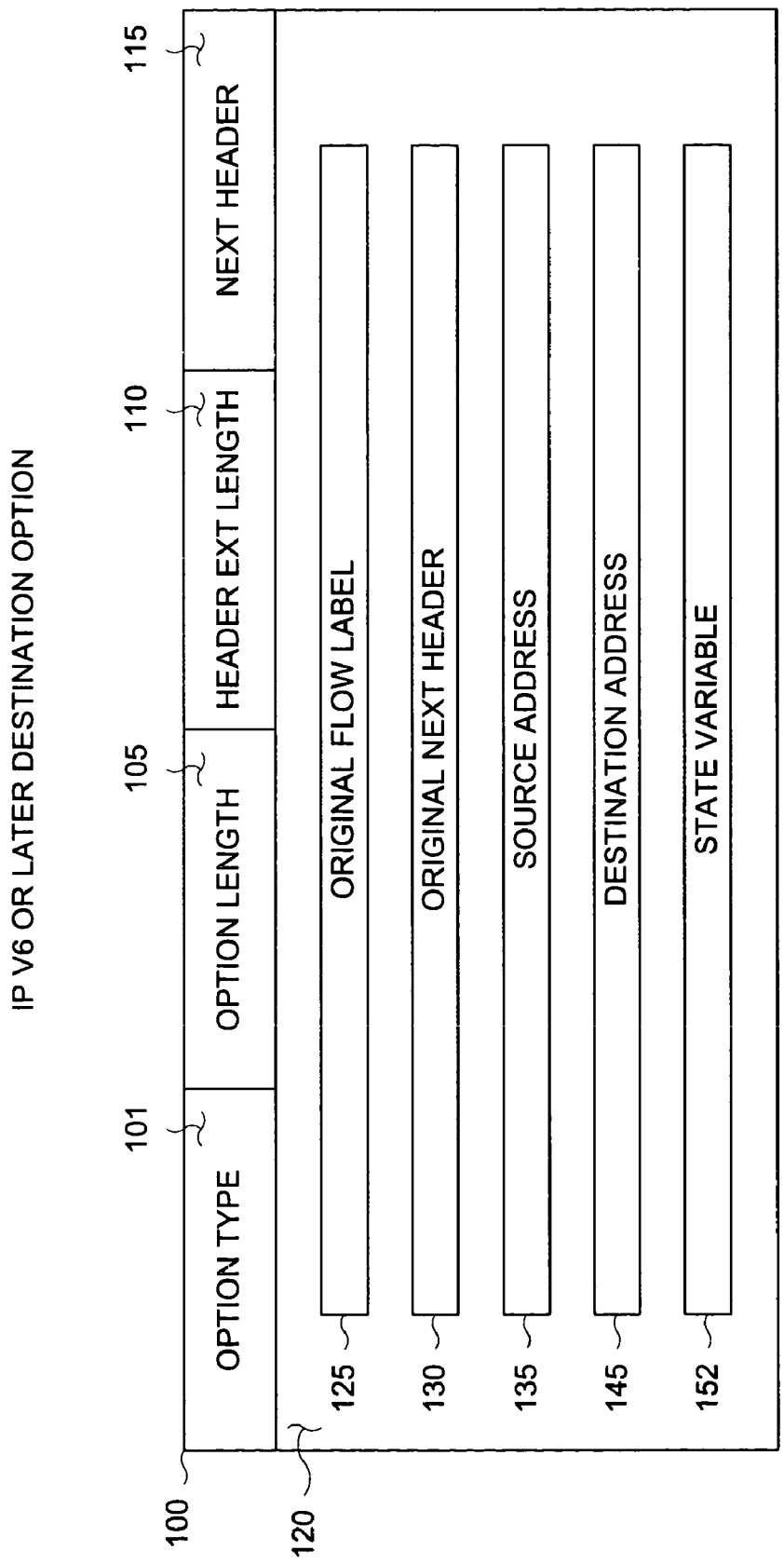
FIG. 7 is a pictorial illustration that depicts one example embodiment of a destination option header.

FIG. 7 is a pictorial illustration that depicts one example embodiment of a destination option header. According to one example embodiment, a destination option header 100 includes an option type field 101, a next header field 115 and a destination option data field 120. According to another alternative embodiment, a destination option header 100 includes an option length field 105. In yet another alternative embodiment, the destination option header 100 further includes a header extension length field 110. When a destination option header 100 is created, the option type field 101 is used to indicate that the type of header created is a destination option header 100. The option length field 105, according to one variation of the present method, is used to indicate the overall length of the destination option header 100. According to yet another variation of the present method, the header extension length 110 is set to reflect the length of the destination option data field 120.

The destination option data field 120, according to one variation of the present method, is used to store an original value of a flow label indicator 125. According to yet another variation of the present method, the destination option data field 120 is used to store the original value of a next header indicator 130. In yet another variation of the present method, the destination option data field 120 is used to store a source address indicator 135. According to yet another variation of the present method, the destination option data field 120 is used to store a destination address indicator 145. It should further be appreciated that any combination of at least a source address and a destination address are used according to the present method as a connection identifier. According to yet another variation of the present method, the destination option data field 120 is used to store one or more state variables 152 pertaining to the state of an implementation of a protocol stack while it is engaged in supporting a particular network connection.

Figure 8:
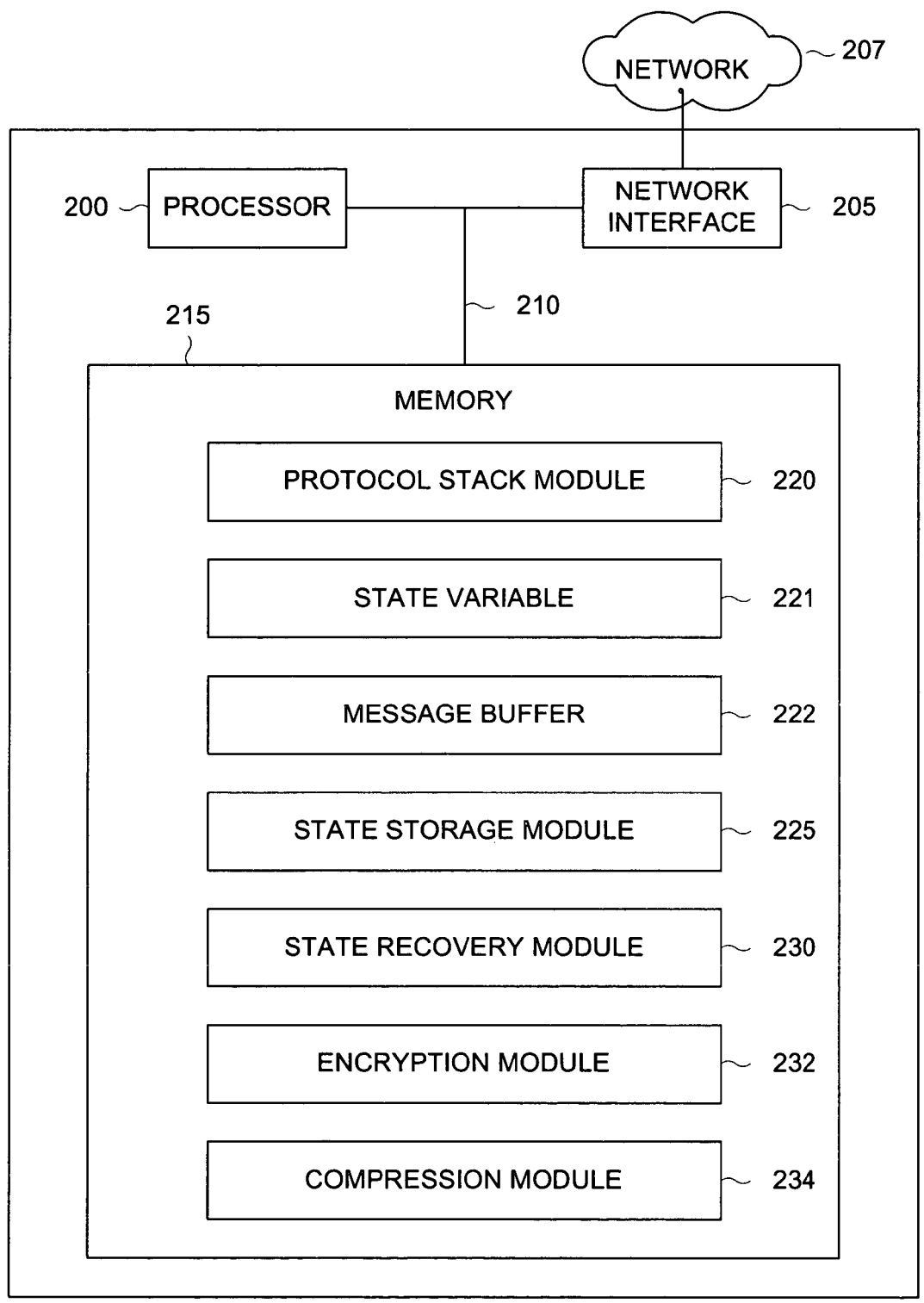
FIG. 8 is a block diagram that depicts one illustrative embodiment of a network centric device capable of restoring a network connection.

FIG. 8 is a block diagram that depicts one illustrative embodiment of a network centric device capable of restoring a network connection. According to this illustrative embodiment, a network centric device comprises one or more processors 200, each of which is capable of executing an instruction sequence. The network centric device further comprises a network interface 205 capable of communicating with a communications network 207. Also included in the network centric device is a memory 215.

The example embodiment of a network centric device heretofore described further includes various functional modules each of which comprises an instruction sequence that can be executed by a processor. The instruction sequence that implements a functional module, according to one alternative embodiment, is stored in the memory 215. The reader is advised that the term "minimally causes the processor" and variants thereof is intended to serve as an open-ended enumeration of functions performed by a processor as it executes a particular functional module (i.e. instruction sequence). As such, an embodiment where a particular functional module causes a processor to perform functions in addition to those defined in the appended claims is to be included in the scope of the claims appended hereto.

The memory 215 has stored therein one or more instruction sequences including, but not limited to a protocol stack module 220, a state storage module 225 and a state recovery module 230. A portion of the memory 215 is used to store one or more state variables 221. These one or more state variables reflect the internal configuration of the protocol stack module 220 and is typically maintained on a connection-by-connection basis. Put plainly, each communications connection maintained by the protocol stack 220 is typically tracked by an independent group of one or more state variables. Another portion of the memory 215 is used to store messages to be conveyed using a particular communications connection. This portion of the memory is known as a message buffer 222.

According to one alternative embodiment, the network centric device further includes an encryption module 232 which is also stored in the memory 215. In yet another alternative example embodiment, the network centric device further includes a compression module 234. The compression module 234 is also stored in the memory 215.

Figure 9:
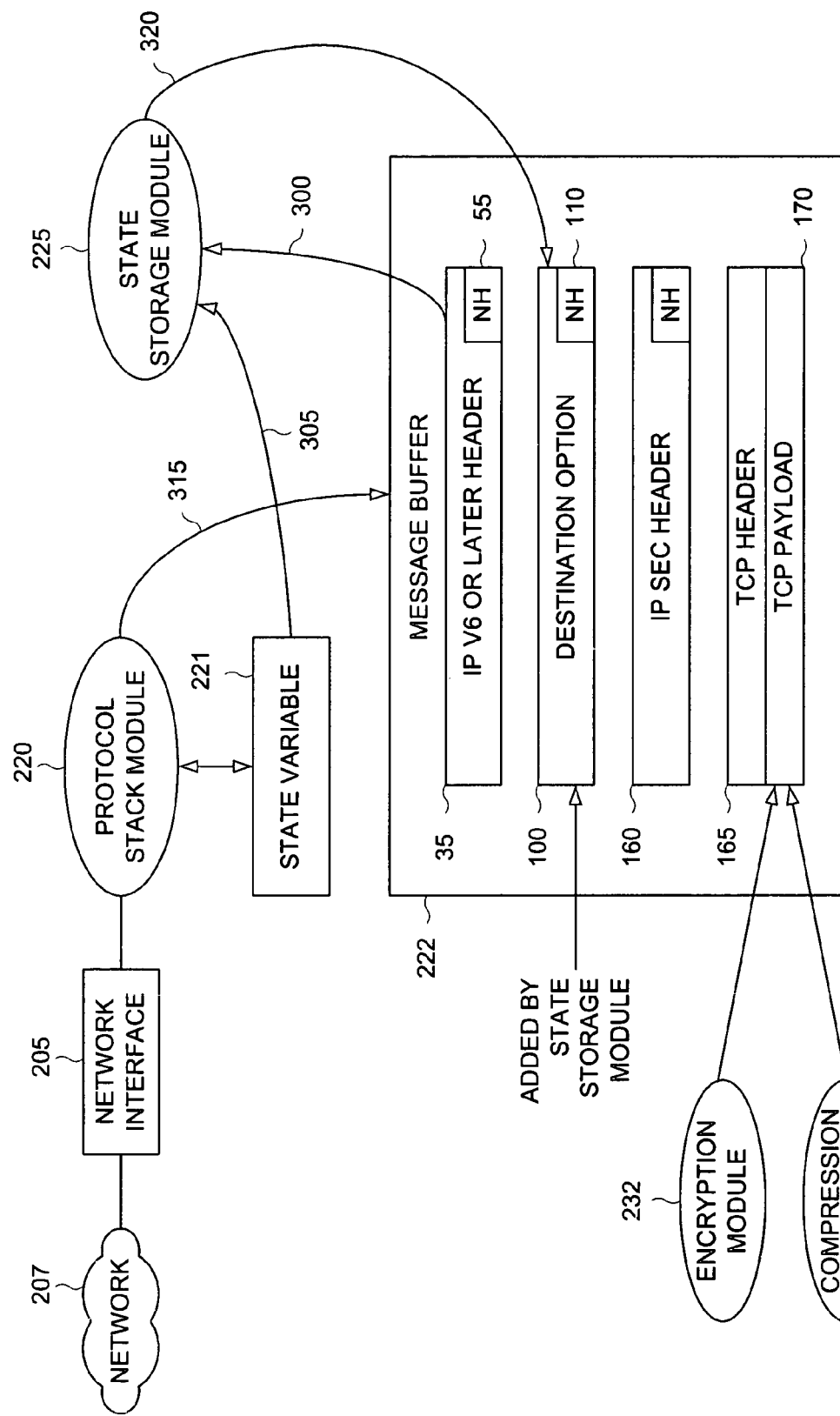
FIG. 9 is a data flow diagram that depicts the operation of one example embodiment of a state storage module.

FIG. 9 is a data flow diagram that depicts the operation of one example embodiment of a state storage module. The state storage module minimally causes a processor to store one or more state variables pertaining to a network connection. The protocol stack module 220, when executed by the processor 200, minimally causes the processor 200 to engage in a connection session using the network interface 205. As the protocol stack module 220 is executed, the processor 200 maintains an internal state for the protocol stack module 220. The processor 200 manages the internal state for the protocol stack using one or more state variables 221 stored in the memory 215. As the state storage module 225 is executed by the processor 200, it minimally causes the processor 200 to retrieve 305 one or more state variables 221 from the memory 215.

FIG. 9 further illustrates that the protocol stack module 220 further minimally causes the processor 200 to assemble a message in the message buffer 222. Typically, the message comprises a payload 170 which is affiliated with a payload header 165. According to one alternative embodiment, the protocol stack module 220 minimally causes the processor 200 to receive a payload and associate the payload with a TCP header 165. As additional layers of communications services are provided by the protocol stack module 220, additional headers are associated with the payload 170. For example, one alternative embodiment of the protocol stack module 220 further minimally causes the processor 200 to encrypt the payload 170. Accordingly, the protocol stack module 220 further minimally causes the processor to include a security header 160. The security header, according to one alternative embodiment, comprises an IPsec header. It should be noted that the claims appended hereto or not intended to be limited scope to any particular form of a security header. Accordingly, various security protocols can be utilized in conjunction with the illustrative embodiment of the network centric device herein described.

As a higher level of communications service is provided, the protocol stack module 220 further minimally causes the processor 200 to include a routing header 35. According to one alternative embodiment, the routing header comprises an IPv6 compliant header. It should be noted that the claims appended hereto are not intended to be limited in scope to include only IPv6 compliant header. The true spirit of the claims appended hereto is intended to include other routing headers commensurate with various types of communications protocols. Furthermore, subsequent versions of the Internet protocol beyond Version 6 that are "backward compatible" with IPv6 are intended to be included in the scope of the claims appended hereto.

As the processor 200 continues to execute the protocol stack module 220, the protocol stack module 220 further minimally causes the processor 200 to link into a chain one or more headers in a message using a next header indicator in a particular header. For example, according to one illustrative use case of the illustrative embodiment herein described, a routing header 35 will include a next header indicator 55. The next header indicator 55 will generally indicate that the next header is a security header 160, a data packet header 165 or some other header type.

The state storage module 225, when executed by the processor 200, minimally causes the processor 200 to include a destination option header 100 in a message created in the message buffer 222. However, it should be appreciated that any implementation wherein the state storage module 225 minimally causes the processor 200 to include connection recovery information in an optional portion of a data packet is intended to be included in the scope of the claims appended hereto. According to one alternative embodiment of a state storage module 225, the processor 200 is caused to store a state pertaining to the state of a connection by preserving the address of a data packet and making the data packet unique. Making the data packet unique, according to one alternative embodiment of the state storage module 225, is accomplished by minimally causing the processor 200 to store in the destination option header 100 at least one an original flow label indicator, an original next header indicator, a source address indicator, a destination address indicator and one or more protocol stack state variables commensurate with the teachings of the present method. It should again be appreciated that, according to one alternative embodiment of a state storage module 225, the processor 200 is caused to make a data packet unique by minimally causing the processor 200 to set to a unique value a flow-label included in an IPv6 or later compliant header.

Accordingly, the processor 200 is further minimally caused to store the original flow-label in the destination option header created by the processor 200 as it executes the state storage module 225.

The processor 200, as it continues to execute the state storage module 225, is further minimally caused to modify the next header indicator 55, which is typically included in a routing header 35 (e.g. in IPv6 or later compliant header), to reflect that the next header in a chain of headers is a destination option header 100. The original value of the modified next header indicator 55 is stored in the destination option header according to the techniques and teachings presented herein. It should be noted that the destination option header 100 will also include a next header indicator 110. The state storage module 225, when executed by the processor 200, further minimally causes the processor 200 to set the next header indicator 110 included in the destination option header 100 to reflect the original value of the next header indicator 55 included in the routing header 35. This action bridges the chain of headers originally created by the processor 200 as it executes the protocol stack module 220 in furtherance of a communications connection between a first process and a second process.

The message created in the message buffer 222, once augmented by the processor 200 with a destination option header 100, includes sufficient information to restore a communications connection. As such, the augmented message, according to one alternative embodiment, is stored in computer readable medium from whence it may be retrieved in support of subsequent restoration of a communications connection. Also, according to yet another alternative embodiment, the augmented message is conveyed to a corresponding protocol stack (e.g. a protocol stack executed in a second computer). In this case, the corresponding protocol stack stores the augmented message in computer readable medium. The communications connection can then be recovered by the corresponding protocol stack.

As already described, the state storage module 225 minimally causes the processor 200 to store a protocol stack state variable, at least according to one alternative embodiment, by minimally causing the processor 200 to retrieve a state variable maintained by the processor 200 as the processor 200 executes the protocol stack module 220. One feature of this alternative embodiment of a state storage module 225 is that the processor 200 is minimally caused to incorporate the retrieved state variable in an optional portion of a data packet. Any payload data 170 is not affected by the inclusion of connection recovery information into such optional portion of a data packet.

FIG. 9 further illustrates that any payload 170, according to one example alternative embodiment, is encrypted. This is accomplished when the processor 200 executes the encryption module 232. When executed by the processor 200, the encryption module 232 minimally causes the processor 200 to encrypt the payload 170. The encrypted payload 170 can then be conveyed normally along with included connection recovery information. It should be appreciated that the encryption module 232, according to one alternative embodiment, further minimally causes the processor 200 to include a security header 160 in a message carrying the payload 170. The encryption module 232 further minimally causes the processor 200, according to one alternative embodiment, to update next header indicators in a chain of headers included in a message created in the message buffer 222. This process can include, but is not necessarily limited to the update of a next header field 55 in a routing header 35 and the update of a next header field 110 to a destination option header 100.

FIG. 9 further illustrates that a payload 170, according to one example alternative embodiment, is compressed. This is accomplished when the processor 200 executes the compression module 234. When executed by the processor 200, the compression module 234 minimally causes the processor 200 to compress the payload 170. The compressed payload 170 can then be conveyed normally along with included connection recovery information.

Figure 10:
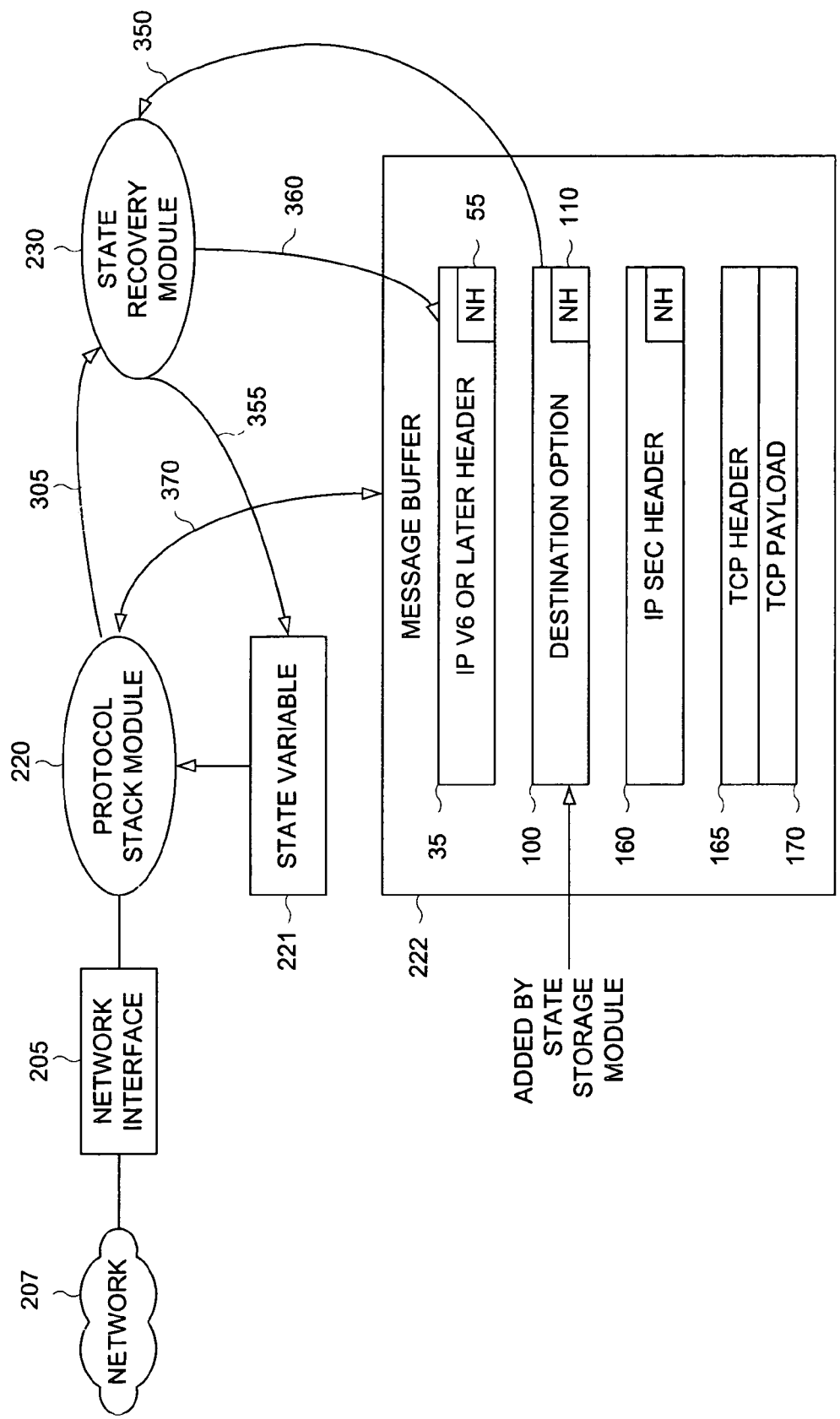
FIG. 10 is a data flow diagram that depicts the operation of one example embodiment of a state recovery module.

FIG. 10 is a data flow diagram that depicts the operation of one example embodiment of a state recovery module. The state recovery module minimally causes a processor to restore a communications connection. When a communications connection needs to be recovered, the processor 200 executes the state recovery module 230. The state recovery module 230, when executed by the processor 200, minimally causes the processor 200 to restore a connection according to a stored state variable. Generally, according to this illustrative embodiment, the state recovery module 230 retrieves the state variable from an optional portion of a data packet. According to one alternative example embodiment, the state recovery module 230 minimally causes the processor 200 to extract a state variable from a destination option header 100. Once one or more state variables are extracted 350 from the destination option header 100, they are directed 355 to a portion of the memory 215 that is used by the protocol stack module 220 to store one or more state variables 221. Accordingly, the result of this action is that the internal state of the protocol stack module 220 is aligned in accordance with the extracted one or more state variables.

It should be appreciated that, according to one alternative embodiment of the state recovery module 230, the processor 200 is minimally caused to determine which connection needs to be restored according to a connection identifier. According to one illustrative use case, restoration of a TCP/IP connection is accomplished by using a combination of a source address identifier and a destination address identifier as a connection identifier. In order to restore the connection, the state recovery module 230, when executed by the processor 200, further minimally causes the processor 200 to retrieve from computer readable medium a flow of data packets wherein each of the data packets includes connection recovery information stored in accordance with the techniques and teachings presented herein. The state recovery module 230 minimally causes the processor 200 to select data packets from the computer readable medium according to the connection identifier and according to a uniqueness property. It should be appreciated that the uniqueness property for each data packet is created in accordance with the techniques and teachings presented herein. In one alternative embodiment, the state recovery module 230 minimally causes the processor 200 to recognize a uniqueness property in the form of a flow-label indicator included in an IPv6 (or later IP version) compliant header. Because the connection recovery information is affiliated with a data packet itself, a data packet can be processed 370 by the processor 200 as it continues to execute the protocol stack module 220. It should be appreciated that the processor 200 will continue to execute the protocol stack module 220 after the requisite one or more state variables affiliated with the data packet are extracted by the processor 200 from an optional portion of the data packet and seeded into a portion of the memory 215 used by the protocol stack module 220 to maintain one or more state variables 221 for a particular communications connection.

The functional modules (and their corresponding instruction sequences) described thus far that enable restoration of a communications connection are, according to one alternative embodiment, imparted onto computer readable medium. Examples of such medium include, but are not limited to, random access memory, read-only memory (ROM), Compact Disk (CD) ROM, Digital Versatile Disk (DVD), floppy disks, hard disk drives and magnetic tape. This computer readable medium, which alone or in combination can constitute a stand-alone product, can be used to convert a general-purpose computer into a device for communicating with a network wherein said device is capable of restoring a communications connection according to the techniques and teachings presented herein. Accordingly, the claims appended hereto are to include such computer readable medium imparted with such instruction sequences that enable execution of the present method and all of the teachings herein described.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for recovering a communication connection comprising:
    storing, by a processor, state variables that pertain to states of plural protocol layers of a protocol stack used for tracking a state of the connection, wherein storing the state variables comprises:
        selecting the state variables maintained by the protocol stack;
        incorporating the selected state variables in an optional portion of a data packet; and
        storing the data packet in a storage medium; and
    retrieving, by the processor, the state variables from the data packet stored in the storage medium; and
    restoring states of the plural protocol layers of the protocol stack according to the retrieved state variables to recover the connection;
    storing in the optional portion of the data packet a source address for the data packet, a destination address for the data packet, and an original next header field value, wherein the data packet further includes a first header and a second header, the first header having a next header indicator having an initial value that points to the optional portion;
    after recovering the connection according to the restored states of the plural protocol layers, modifying the data packet by removing the optional portion from the data packet; and
    as part of modifying the data packet, modifying the next header indicator to a different value to point to the second header, wherein modifying the next header indicator is based on the original next header field value stored in the optional portion.

2. The method of claim 1 wherein storing the state variables comprise:
    preserving addressing of the data packet; and
    making the data packet unique.

3. The method of claim 2 wherein making the data packet unique comprises setting to a unique value a flow label included in an Internet Protocol header of the data packet.

4. The method of claim 1 further comprising encrypting a payload portion of the data packet.

5. The method of claim 1 further comprising compressing a payload portion of the data packet.

6. The method of claim 1 wherein retrieving the state variables comprises:
    extracting the state variables from the optional portion of the data packet; and
    aligning an internal state of the protocol stack according to the extracted state variables.

7. The method of claim 1, wherein the optional portion comprises an optional header of the data packet, the method further comprising:
    chaining at least one other header with the optional header in the data packet.

8. The method of claim 7, wherein chaining the at least one other header with the optional header comprises chaining an Internet Protocol header and a security header with the optional header.

9. The method of claim 1, wherein restoring the states of the plural protocol layers of the protocol stack comprising restoring the states of a connection layer and a Transmission Control Protocol/Internet Protocol (TCP/IP) layer.

10. The method of claim 1, wherein the processor is part of a first computer, the method further comprising:
    the processor further causing the data packet as augmented by the optional portion to be sent to a second computer to allow the second computer to restore a state of a protocol stack in the second computer.

11. A network centric device comprising:
    a processor;
    a network interface to communicate with a communications network;
    a memory to store one or more instruction sequences; and
    wherein the one or more instruction sequences stored in the memory include:
        a protocol stack that, when executed by the processor, minimally causes the processor to engage in a communications session for communicating a data packet using the network interface;
        a state storage module that, when executed by the processor, minimally causes the processor to store state variables that pertain to states of plural protocol layers of a protocol stack, wherein the protocol stack is to track a state of a connection between the network centric device and a second device over the communications network, wherein the state variables are stored in an optional header of the data packet, the optional header to further contain a source address for the data packet, a destination address for the data packet, and an original next header field value, wherein the data packet further includes a first header and a second header, the first header having a next header indicator having an initial value that points to the optional header; and
        a state recovery module that, when executed by the processor, minimally causes the processor to:
            restore an internal state of the protocol stack according to the stored state variables to recover the connection;
            after recovering the connection according to the restored internal state of the protocol stack, modify the data packet by removing the optional header from the data packet; and as part of modifying the data packet, modify the next header indicator to a different value to point to the second header, wherein modifying the next header indicator is based on the original next header field value stored in the optional header.

12. The network centric device of claim 11 wherein the state storage module causes the processor to store the state variables by minimally causing the processor to:
preserve an address of the data packet; and
make the data packet unique.

13. The network centric device of claim 12 wherein the state storage module is to cause the processor to make the data packet unique by minimally causing the processor to set to a unique value a flow-label included in an Internet Protocol header of the data packet.

14. The network centric device of claim 11 wherein the state storage module is to cause the processor to store the state variable by minimally causing the processor to:
retrieve the state variables maintained by the processor as the processor executes the protocol stack; and
incorporate the retrieved state variables in the optional header of the data packet.

15. The network centric device of claim 11 wherein the state recovery module is to cause the processor to restore the connection by minimally causing the processor to:
extract the state variables from the optional header of the data packet; and
align an internal state of the protocol stack according to the extracted state variables.

16. The network centric device of claim 11, wherein the state storage module, when executed by the processor, minimally causes the processor to further store a flow label of the data packet in the optional header.

17. The network centric device of claim 16, wherein the optional header is chained to an Internet Protocol header, wherein the flow label stored in the optional header is an original flow label of the Internet Protocol header, and wherein the state storage module is to modify the flow label in the Internet Protocol header.

18. The network centric device of claim 11, wherein the internal state of the protocol stack is restored by restoring the states of the plural protocol layers including a connection layer and a Transmission Control Protocol/Internet Protocol (TCP/IP) layer.

19. The network centric device of claim 11, wherein the state storage module, when executed by the processor, minimally causes the processor to further:
send the data packet as augmented by the optional header to the second device over the communications network to allow the second device to restore a state of a protocol stack in the second device.

20. A method for recovering a communication connection comprising:
storing, by a processor, state variables that pertain to states of plural protocol layers of a protocol stack used for tracking a state of the connection, wherein storing the state variables comprise selecting the state variables maintained by the protocol stack, and incorporating the selected state variables in an optional portion of a data packet;
retrieving, by the processor, the state variables and also restoring a state of the protocol stack according to the state variables to recover the connection;
storing in the optional portion of the data packet a source address for the data packet, a destination address for the data packet, and an original next header field value, wherein the data packet further includes a first header and a second header, the first header having a next header indicator having an initial value that points to the optional portion;
after recovering the connection according to the restored state of the protocol stack, modifying the data packet by removing the optional portion from the data packet; and
as part of modifying the data packet, modifying the next header indicator to a different value to point to the second header, wherein modifying the next header indicator is based on the original next header field value stored in the optional portion.

21. A method of recovering a communication connection comprising:
storing, by a processor, state variables that pertain to states of plural protocol layers of a protocol stack used for tracking a state of the connection, wherein storing the state variables comprises:
selecting the state variables maintained by the protocol stack; and
incorporating the selected state variables in an optional portion of a data packet;
retrieving, by the processor, the state variables and also restoring a state of the protocol stack according to the state variables to recover the connection;
selecting the data packet incorporated with the optional portion from multiple data packets each augmented with a respective optional portion having respective state variables, wherein the multiple data packets are stored in a storage medium,
wherein selecting the data packet from the multiple packets is based on a connection identifier represented by a source address and destination address in the selected data packet and based on a unique value of a flow label in an Internet Protocol header of the data packet.

22. A network centric device comprising:
a processor to execute one or more instruction sequences;
a network interface to communicate with a communications network;
a memory to store the one or more instruction sequences; and
wherein the one or more instruction sequences stored in the memory include:
a protocol stack that, when executed by the processor, minimally causes the processor to engage in a communications session for communicating a data packet using the network interface;
a state storage module that, when executed by the processor, minimally causes the processor to store state variables that pertain to states of plural protocol layers of the protocol stack, wherein the protocol stack is to track a state of a connection between the network centric device and a second device over the communications network, wherein the state variables are stored in an optional header of the data packet, wherein the storing of the state variables includes preserving an address of the data packet and making the data packet unique by setting to a unique value a flow-label included in an Internet Protocol header of the data packet; and
a state recovery module that, when executed by the processor, minimally causes the processor to:
restore an internal state of the protocol stack according to the stored state variables to recover the connection, and select the data packet incorporated with the optional portion from multiple data packets each augmented with a respective optional portion having respective state variables, wherein the multiple data packets are stored in a storage medium, wherein the data packet is selected from the multiple packets based on a connection identifier represented by a source address and destination address in the selected data packet and based on the unique value of the flow-label.

23. A non-transitory computer readable medium having imparted thereon one or more instruction sequences for restoring a communications connection, the one or more instruction sequences including:

a state storage module that, when executed by a processor, minimally causes the processor to store state variables that pertain to states of plural protocol layers of a protocol stack, wherein the protocol stack is to track a state of the communications connection, wherein the state variables are stored in an optional header of a data packet, wherein the optional header further stores a source address for the data packet, a destination address for the data packet, and an original next header field value, wherein the data packet further includes a first header and a second header, the first header having a next header indicator having an initial value that points to the optional header;

a state recovery module that, when executed by the processor, minimally causes the processor to:

restore an internal state of the protocol stack according to the stored state variables and the data packet to recover the communications connection;

after recovering the connection according to the restored internal state of the protocol stack, modify the data packet by removing the optional header from the data packet; and as part of modifying the data packet, modify the next header indicator to a different value to point to the second header, wherein modifying the next header indicator is based on the original next header field value stored in the optional header.

24. The computer readable medium of claim 23 wherein the state storage module is to cause the processor to store the state variables by minimally causing the processor to:
preserve an address of the data packet; and
make the data packet unique.

25. The computer readable medium of claim 24 wherein the state storage module causes the processor to make the data packet unique by minimally causing the processor to set to a unique value a flow-label included in an Internet Protocol header.

26. The computer readable medium of claim 23 wherein the state storage module is to cause the processor to store the state variables by minimally causing the processor to:
retrieve the state variables maintained by the processor as the processor executes the protocol stack; and
incorporate the retrieved state variables in the optional header of the data packet.

27. The computer readable medium of claim 23, wherein the state storage module, when executed by the processor, minimally causes the processor to further:
send the data packet as augmented by the optional header to a second device over the communications network to allow the second device to restore a state of a protocol stack in the second device.

28. A non-transitory computer readable medium having imparted thereon one or more instruction sequences for restoring a communications connection, the one or more instruction sequences including:

a state storage module that, when executed by a processor, minimally causes the processor to store state variables that pertain to states of plural protocol layers of a protocol stack, wherein the protocol stack is to track a state of the communications connection, wherein the state variables are stored in an optional header of a data packet, wherein the storing of the state variables includes preserving an address of the data packet and making the data packet unique by setting to a unique value a flow-label included in an Internet Protocol header; and a state recovery module that, when executed by the processor, minimally causes the processor to:

restore an internal state of the protocol stack according to the stored state variables and the data packet to recover the communications connection;

select the data packet incorporated with the optional portion from multiple data packets each augmented with a respective optional portion having respective state variables, wherein the multiple data packets are stored in a storage medium, wherein selecting the data packet from the multiple packets is based on a connection identifier represented by a source address and destination address in the selected data packet and based on the unique value of the flow label.

* * * * *